United States Patent [19]

Daniels

[11] 4,283,875
[45] Aug. 18, 1981

[54] LINE RETRIEVING AND DISPENSING DEVICE

[76] Inventor: Dennis Daniels, Rte. 2 Box 782, Quilcene, Wash. 98376

[21] Appl. No.: 93,681

[22] Filed: Nov. 13, 1979

Related U.S. Application Data

[63] Continuation-in-part of Ser. No. 949,947, Oct. 10, 1978, Pat. No. 4,216,602.

[51] Int. Cl.³ .............................................. A01K 87/00
[52] U.S. Cl. ........................................ 43/18 R; 43/25
[58] Field of Search ...................... 43/18 R, 19, 24, 25

[56] References Cited

U.S. PATENT DOCUMENTS

| | | | |
|---|---|---|---|
| 2,806,700 | 9/1957 | Heimers et al. | 43/18 R |
| 2,851,811 | 9/1958 | Mantell | 43/18 R |
| 2,945,694 | 7/1960 | Heimers et al. | 43/18 R |
| 2,945,695 | 7/1960 | Heimers et al. | 43/18 R |
| 3,863,381 | 2/1975 | Ladany | 43/25 |

Primary Examiner—Gary L. Smith
Assistant Examiner—J. T. Zatarga
Attorney, Agent, or Firm—Seed, Berry, Vernon & Baynham

[57] ABSTRACT

A set of travelling line guiding members are moved relative to stationary line guiding members with the two sets of line guiding members containing separate individual wraps or partial loops of line. By moving the guiding members relatively toward and away from one another the line can be quickly released when letting out line or retrieved for retracting a line. Wrap retaining devices are provided for releasably holding the wraps of line when in the retracted position after the movable line guiding members are moved from the retracted position toward the fixed line guiding members.

7 Claims, 11 Drawing Figures

U.S. Patent   Aug. 18, 1981   Sheet 1 of 4   4,283,875
FIG. 2
FIG. 3
FIG. 1
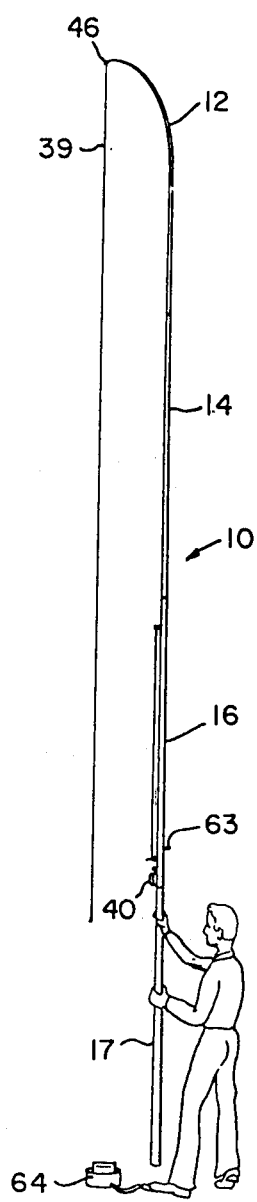
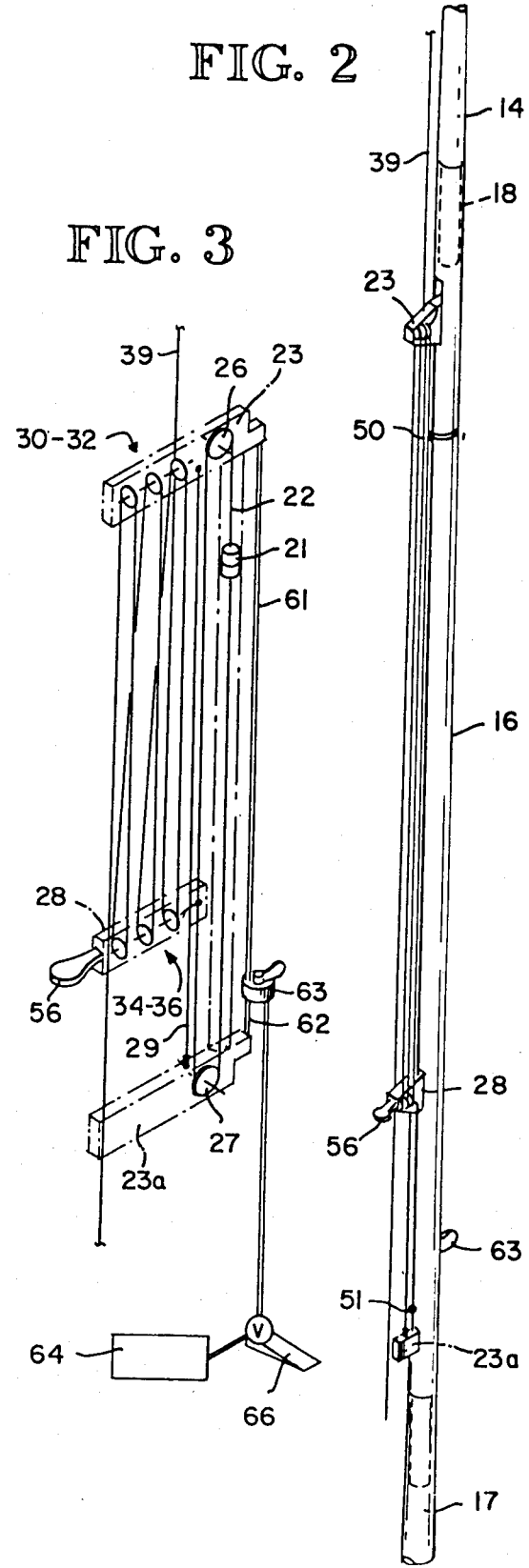

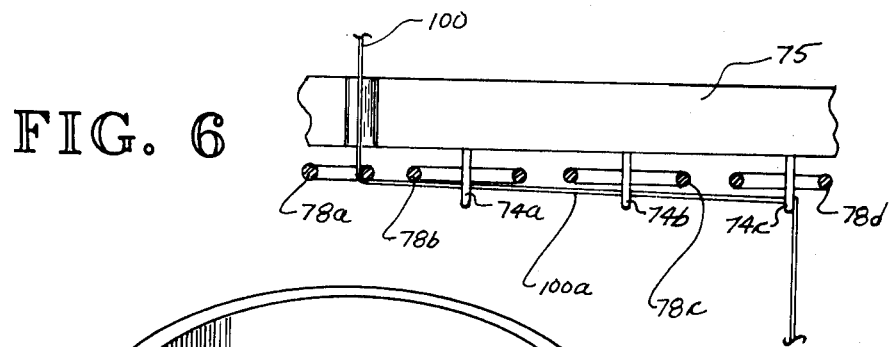
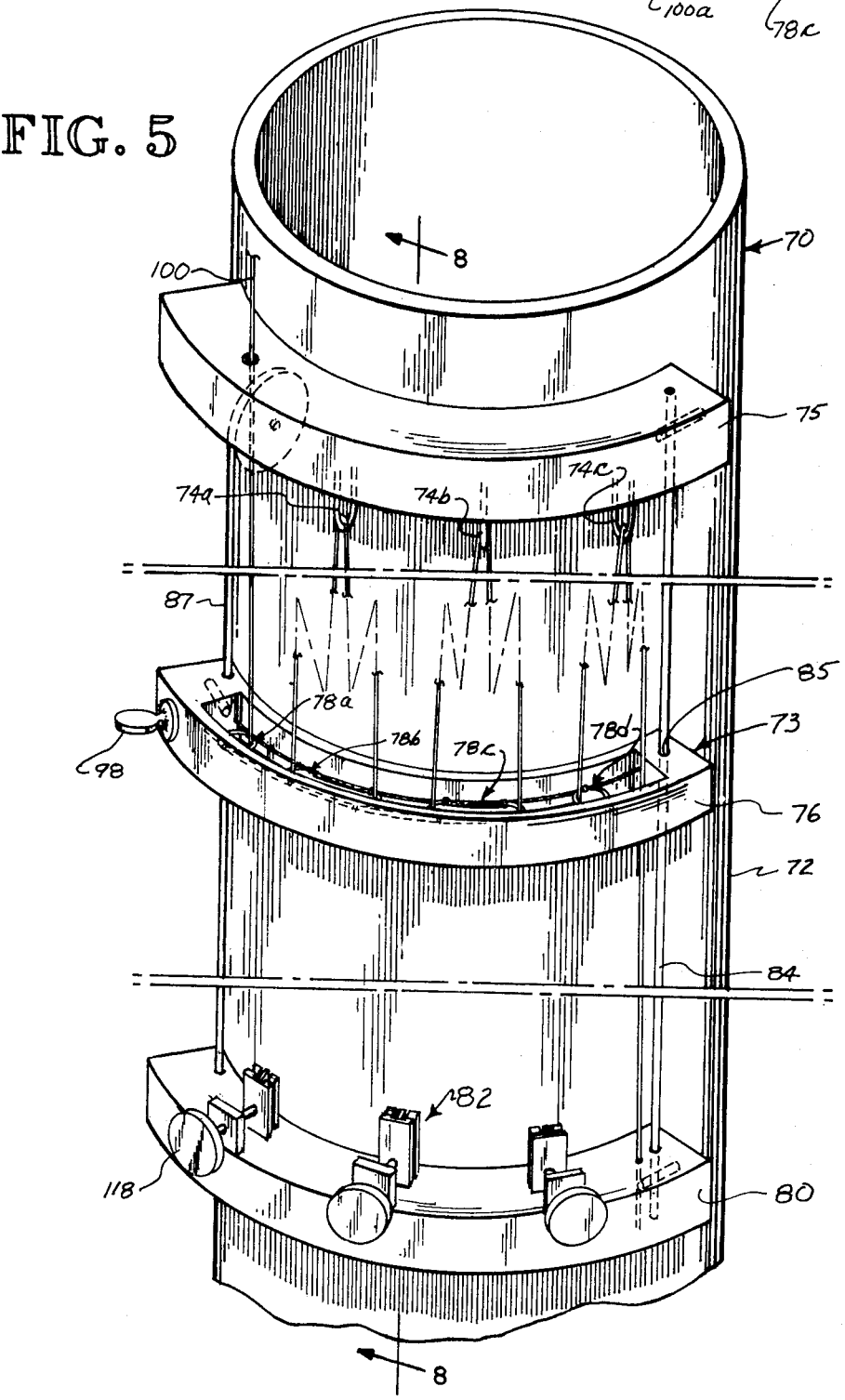
FIG. 6
FIG. 5

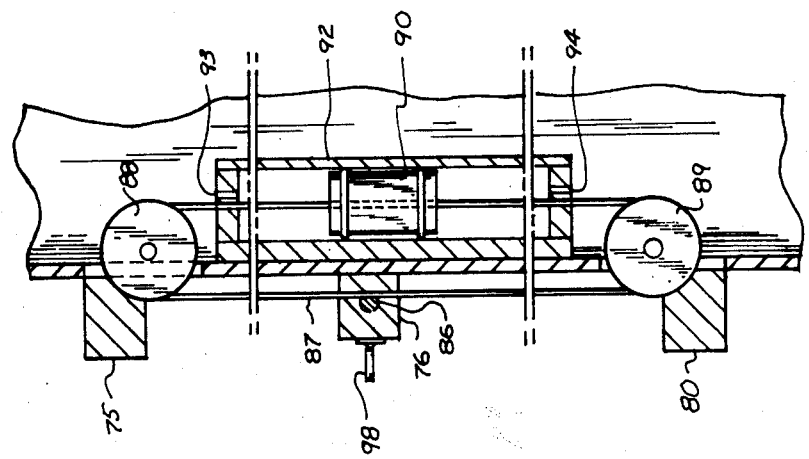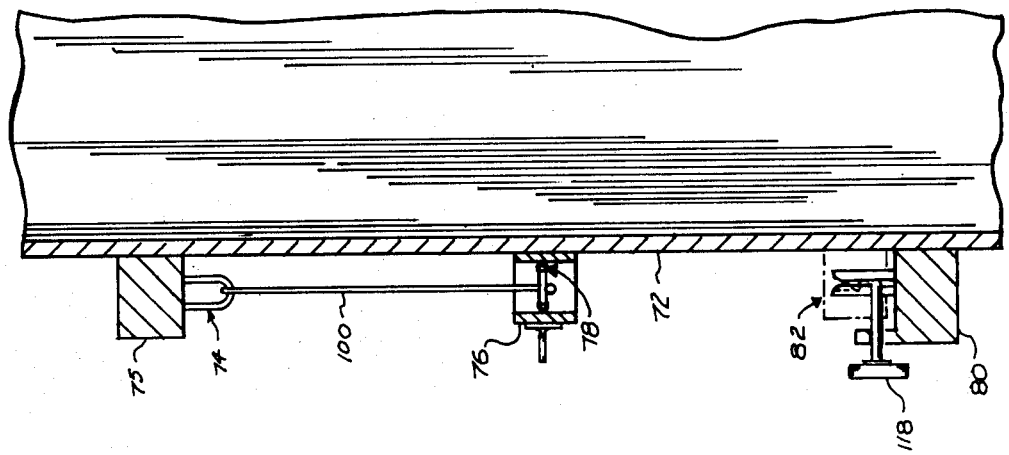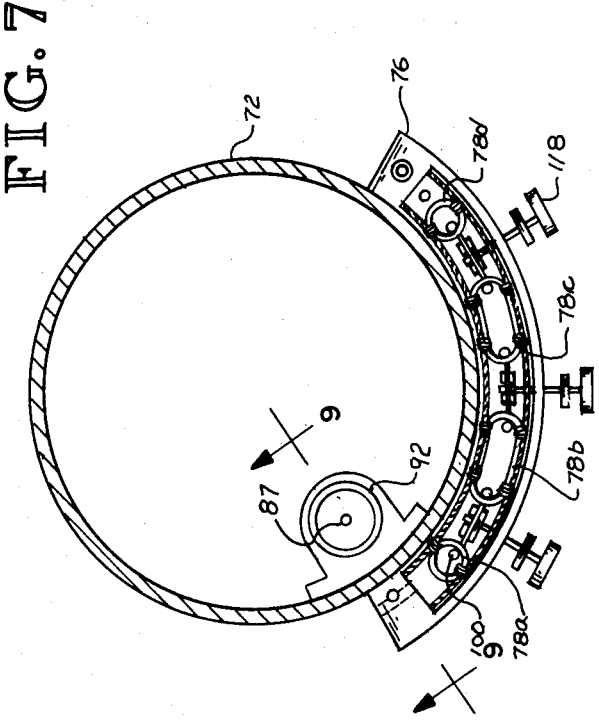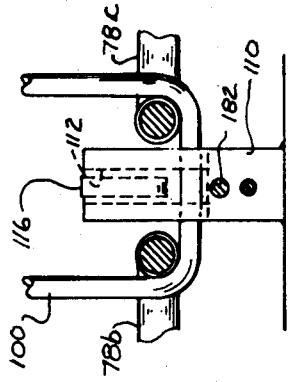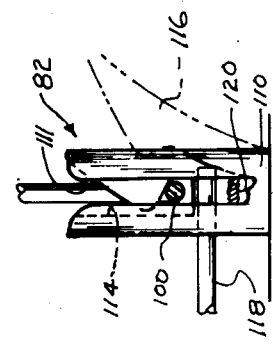

LINE RETRIEVING AND DISPENSING DEVICE

CROSS REFERENCE TO RELATED APPLICATIONS

This is a continuation-in-part of U.S. Ser. No. 949,947, filed Oct. 10, 1978 now U.S. Pat. No. 4,216,602 issued on Aug. 12, 1980.

BACKGROUND OF THE INVENTION

1. Field of the Invention

This invention pertains to line dispensing and retrieving equipment and, more particularly, to devices which dispense or retrieve at frequent intervals a generally predetermined amount of line. In one embodiment of the invention the device is particularly suitable for casting and retrieving of lightweight fishing line.

2. Description of the Prior Art

In certain types of fishing, practiced extensively in Great Britain and Europe, a long multiple section pole is used for placing the hook end of the line a considerable distance outwardly from the shore of the river or other body of water being fished. Generally, anywhere from six to thirty feet of line is then released for hooking the fish. In competitive fishing it is desirable to deliver the line to the area being fished and then retrieve the hooked fish as quickly as possible. This operation may be repeated many dozens of time during a fixed period of time in competition.

Anglers have difficulty in making repetitive placements of the released line into the area being fished and then withdrawing a hooked fish to the shore. In some cases thirty-foot long poles of multiple sections are employed with a very short line at the end of the pole. This involved breaking down the pole to reach the outer section where the angler could retrieve the hooked fish.

In other applications for dispensing and retrieving lines such as with powered underwater spear guns it has still remained a problem to allow extension of the line outwardly from the pole or the gun handle with a minimum friction or drag on the line and with a small compact line storage device. In casting with heavy lines and heavy lures it has been been awkward and difficult to allow the line to pay out quickly and without drag or snarling to assure the lure can be thrust far enough to reach its desired position.

When lightweight lines and lures are employed, the difficulty of paying out and retrieving lines is increased due to the wet line adhering to the surface of the pole and its tendency to coil or snarl.

SUMMARY OF THE INVENTION

It is the object of this invention to provide a device for storing a frew wraps of line on a pole for quick release and retraction of the line.

It is another object of this invention to provide a line dispensing and retrieving device which allows the relatively low friction extension of the line and immediate full retraction of the total length of line extended.

It is still another object of this invention to provide an apparatus for temporarily retaining multiple wraps of line which can then be released without friction during casting.

These objects are best obtained by providing apparatus which includes a fixed set of line guiding members transversely spaced from one another mounted on an outer end of a pole, a second movable set of line guiding members which are freely movably mounted on an inner end of the pole with the line being wrapped between the two sets of line guiding members without overlapping of the wraps of the partial loops, and providing means for freely moving the movable set of line guiding members toward and away from the fixed line guiding members in a single stroke of movement. The line guiding members are preferably mounted externally on the pole for lightweight fishing line but can be mounted internally of the pole particularly where the line will be powered out or will be used with a heavy weight or lure in which the kinetic energy or momentum will easily draw the line into the fully extended position.

Basically, the second feature of this invention is to employ loop retaining members which hold the sets of loops in the retracted position while the movable line guiding members are moved to the fixed line guiding members. In this condition then there are no guides or any other structure in the path of the partial loops as the line is extended so that upon release of the loop retaining device the line can be pulled freely through space into its fully extended position.

BRIEF DESCRIPTION OF THE FIGURES OF THE DRAWINGS

FIG. 1 is a schematic of a fishing pole embodying the invention.

FIG. 2 is a fragmentary side elevation with parts broken away for clarity of the embodiment of the invention.

FIG. 3 is a schematic of the line retrieving and dispensing device.

FIG. 5 is a fragmentary side elevation of a second embodiment of the invention.

FIG. 6 is a schematic of a fragmentary illustration of the embodiment of FIG. 5 showing the line in an extended position.

FIG. 7 is a transverse section of the embodiment shown in FIG. 5.

FIG. 8 is a longitudinal fragmentary section taken along the line 8—8 of FIG. 5.

FIG. 9 is a fragmentary longitudinal section taken along the line 9—9 of FIG. 7.

FIG. 10 is a fragmentary detail of a portion of the loop retaining device.

FIG. 11 is a fragmentary side elevation of the loop retaining device shown in FIG. 10.

DETAILED DESCRIPTION OF THE PREFERRED EMBODIMENTS

Figure 4:
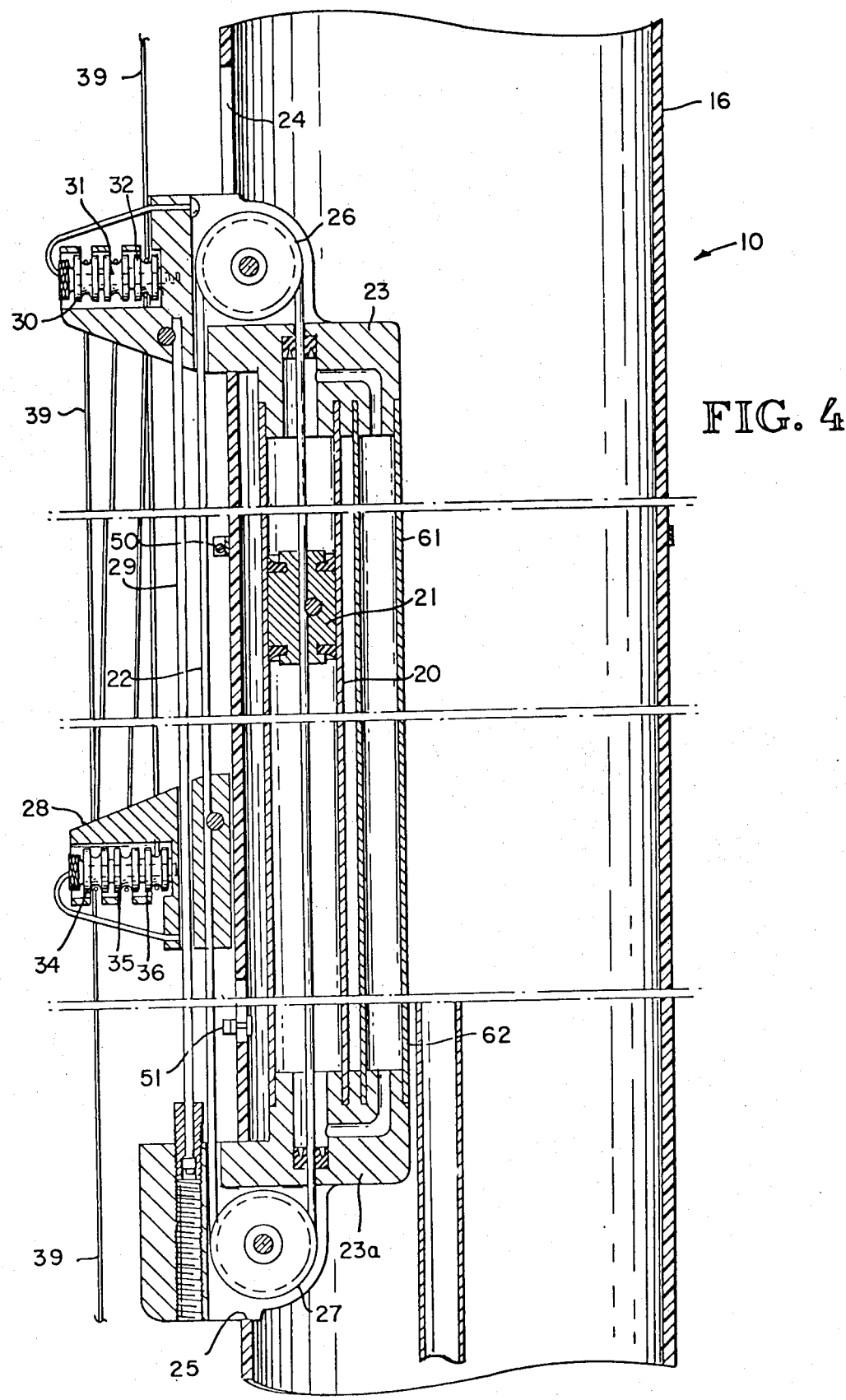
FIG. 4 is a fragmentary longitudinal section of the retrieving and the dispensing device.

A fishing pole or other pole type or handle device 10 is preferably formed of hollow multiple portions such as a tip portion 12, a standard middle portion 14, a linear line collecting portion 16 and a handle portion 17. It will be understood, of course, that in the case of an underwater spear gun fishing type device, the pole will essentially constitute a single short cylindrical piece or handle rather than a long pole. In the fishing pole embodiment these portions can be of a single tubular or solid rod but preferably are individual tubular glass or carbon fibre hollow tubes joined together by conventional friction ferrules 18. The pole section or portions can be of a convenient sizes such as two meters and additional sections can be added. The total rod length may be from twelve to thirty feet.

In the preferred embodiment, linear line collecting portion 16 is provided with an internal rigid tube forming an elongated plugged cylinder 20 in which a piston 21 is slidably received. The piston is coupled to the line 22 which passes out the opening 24 toward the tip end and again out of the opening 25 near the handle end, the line 22 passes over sheaves 26 and 27 and is then coupled to a carriage 28. The sheaves 26 and 27 are mounted on brackets 23 and 23A secured to the rod portion 17 within the openings 24 and 25. A taut line 29 is affixed to the brackets. The carriage slides on the line 29. Mounted on the bracket 23 are a set of stationary sheaves or guides 30–32. Mounted on the carriage 28 are a second set of movable sheaves or guides 34–36. As is readily apparent by moving the piston 21, the movable sheaves 34–36 can be reciprocated toward and away from the stationary sheaves 30–32. In the alternative an elastic band can be attached between the fixed or movable sets of sheaves to elastically draw the movable sheaves toward the fixed sheaves.

Line 39 from a standard spool 40 is wrapped in multiple wraps around the stationary and movable sheaves and hence moves out through an eye 46 at the tip end of the rod. The line is connected to a suitable line and hook.

Adjustable stops 50 and 51 are provided on the guide track to limit the stroke of the movable carriage 28 and thus limit the amount of line which can be extended and withdrawn. In one embodiment a finger grip 56 is provided so that the carriage can be manually reciprocated and thus the piston 21 and additional structure can be eliminated. Still further, the piston 21 can also be carried in a cylinder or tube externally of the rod or can be mounted within a cylindrical rod portion. To operate the fluidic or air powered system, air line 61 and 62 which are coupled to a conventional two position, rotary valve 63. The valve is placed near the handle end of the line collection portion 16 so that it is easily accessible to the angler. Air from the accumulator 64 pressurized from a conventional foot air pump 66 provides a pressurized supply of air or fluid selectively coupled to either line 61 or 62 for determining direction of the movement of the piston 21. In the alternative a standard pressurized CO-2 cartridge can be substituted for the pump and accumulator. By reciprocating the piston the carriage 28 follows, shortening or lengthening the distance between the movable and fixed sheaves.

In this type of fishing where the line is extended or retrieved numerous times, but generally in always the same amount, it is apparent that the adjustable reciprocatory stroke of the carriage enables repetitive accurate dispensing of an amount of line. Secondly, the line can be very rapidly retrieved by the single stroke of reciprocation rather than by numerous turns of a reel.

When fishing is done by using many rod sections but a short length of line, the movable sheaves can be moved toward the stationary sheaves to lengthen the line so that the hooked fish can be removed by the angler.

As an alternative, the linear line collecting portion or section of the rod can be removed entirely and a short handle section with a conventional bait casing reel added where more conventional bait casting is employed.

While the fixed line guides or sheaves and movable line guides or sheaves are located externally of the rod, it should be understood that they can also be placed internally of the rod.

The wrap retaining device of this invention is best shown in FIGS. 5–11. A pole 70 is provided with an inner portion 72. On the inner end 72 or inner portion of the pole 70 is provided the line extending and retrieving device 73. It should be understood that the inner portion 72 can be the handle of a spear gun as well as be the inner end of a long, lightweight, light line casting fishing pole as in FIG. 1. On the inner portion 72 is a bracket 75 on which are a plurality on stationary transversely spaced line guides or hooks 74. A second bracket 76 is movably mounted toward and away from the bracket 75 and is provided with a plurality of transverse spaced rings or second line guides 78. A third bracket 80 is fixed to the pole and holds a plurality of transversely spaced wrap restraining members 82. A taut line or post 84 is attached between the two stationary brackets 75 and 80. The movable bracket 76 is provided with a guide bore 85 and slides on the post 84 when moving toward and away from the stationary bracket 75. In the preferred form the opposite side of the bracket 76 is fixed, such as by pin 86, to a line 87 that runs over a sheave 88 rotatably mounted on stationary bracket 75 and a second sheave 89 which is rotatably mounted on the stationary bracket 80. A piston 90 is fixed to the line 87 and runs in a cylinder which is coupled to air lines 93 and 94 for controlling the position of the piston and thus the position of the moving bracket 76. In the alternative, of course, as in the preferred embodiment the movable bracket can have a standard grip 98 for manually moving the movable bracket.

As is readily understood, and shown in FIGS. 5 and 8, for example a line 100, whether a fishing line attached to a light object or a heavy object, or a line attached to a propelled object, such as a spear of an underwater fishing spear gun, passes through the rings 78 and guides 74 by passing first down through a first ring 78a and thence up through ring 78b, around guide 74a, down through ring 78b, up through ring 78c, around guide 74b, down through ring 78c, up through ring 78d and around guide 74c and down unitl the line finally returns and is either dead ended on the stationary bracket 80 or can run to the conventional line spool 40 (FIG. 1). The spool 40 serves no other function than as a convenient supply of fresh line or to make a major adjustment in the length of line extended and retracted.

FIG. 6 illustrates the position of the movable guides or rings 78a–78d and the stationary guides or hooks 74a–74c. As is readily apparent from FIG. 6, the sets of movable guides move into interdigitating relationship with the fixed guides so that the line 100 transverses a substantially straight path 100a when the movable bracket 76 is adjacent the stationary bracket 75. To retrieve line 100, of course, the movable bracket is moved away from the stationary bracket pulling loops or partial loops of the line downwardly any desired distance preferably about one meter. This will return approximately 7 meters of length of line in a single stroke.

It is a unique feature of this invention to provide free withdrawal of the line to pay out line when the object on the end of the line is propelled by power or cast by the angler. This is accomplished by selectively holding the wraps or partial loops of line in the retracted position while the movable bracket is moved upwardly adjacent fixed bracket 75 to the position shown in FIG. 6. As best shown in FIG. 6 it can be seen that the rings 78b–78d move upwardly beyond the lower ends of the wire hooks 74a–74c interdigitating with the hooks. This allows the line 100 when extended and taut to form a straight line through the hooks 74a–74c as indicated by the reference numeral 100a without wrapping around each ring. This straight-line path thus eliminates any source of friction which would otherwise possibly cause the line to snarl or not move freely when being paid out.

Between each of the rings 78a–78d wraps or partial loops of the line become suspended. One of the advantages of the ring-shaped guides on the movable bracket 78 is that the wraps of line become self-centering in the two closest adjacent portions of adjacent rings. This can be seen in FIGS. 11 and 7, for example. As a result, the line can then be engaged and retained by the line retaining members 82 since the wrap of line or partial loop will always appear and be centered over the retaining members 82 when the bracket 78 is retracted.

Each retaining member 82 (FIGS. 5 and 10) includes a forked block 110 defining a pair of aligned slots 111 which receive the line 100. A retaining hook slot 112 is provided in another side of the block at right angels to the slots 111. Finally, a groove 114 is provided in alignment with the hook slot 112 in an inside surface of the block 110. Pivotally mounted as a separate or integral piece of the block 110 is a hook 116 which can be moved into the phantom line position in FIG. 10 by a manual depressed button 118 and upon release of the button will allow the hook to move to the left into the solid position shown in FIG. 10. When released, the hook member moves into the groove 114. A small tension spring 120 can be provided if the resiliency of the plastic hook 116 is not sufficient to pull the hook into the solid line position. As the line 100 is moved downwardly by the rings in the movable bracket 76, the aligned wraps of line between the rings 78 are pushed beyond the hooks 116, snapping the hook open and allowing the hook to snap closed into the position shown in FIG. 10. Thus each of the line wraps or partial loops become trapped in the restraining member 82. One or more of the buttons 118 can be depressed at any one time to control the amount of line which will be paid out when the line 100 is pulled from the rod by momentum of a weight or propulsion of a spear or the like. That is, if all buttons are depressed at one time, the full extent of the line will be extended. If only the button to the left in FIG. 7 is depressed, only a few of the wraps of line will be payed out.

In operation of all of the embodiments, it can be seen that by manually or powered action the movable bracket 76 can be reciprocated toward fixed bracket 75 or 23 for paying out line or away from the fixed bracket 75 or 23 for retrieving line.

If completely free dispensing or paying out of the line is needed, the line can be held in the retracted position in separate wraps or partial loops by the retaining members 82. Then the movable bracket 76 is moved up into the position shown in FIG. 6. By casting and depressing all of the buttons 118 at the full extent of the throw of the rod, much as in bait casting from an open-face casting reel, the line will move without any obstruction whatsoever as it passes through the space between the fixed bracket 80 and the fixed bracket 75. If less than the full several loops are desired to be fed out, then only the first of the buttons is depressed.

While the preferred embodiments of the invention have been illustrated and described, it should be understood that variations will be apparent to one skilled in the art without departing from the principles herein. For example, elastic band can be substituted for the fluidic or air powered actuation system shown in FIG. 9. Preferably, this would occur by fixing one end of the elastic band to the movable bracket 76, running the band over the sheave 88 and fixing the other end of the elastic band to stationary bracket 80. This would give a two-fold multiple of elasticity available in the elastic band. Still further, the powered movement of the movable bracket 76 can be replaced altogether with a manual movement knob 98. Furthermore, the manual knob 98 can be used to reciprocate the movable bracket back and forth less than the full extent of movement between the two fixed brackets for playing a fish, if desired. As is also understood the movable and fixed brackets 28 and 23 can be revised as can the fixed brackets 78 and 80. Accordingly, this invention is not be be limited to the specific forms illustrated in the drawings.

I claim:

1. A fishing line retrieving and casting device for use on an elongated pole having at least an outer and inner portion, comprising:

a pole having inner and outer portions, line storage means on said inner portion for accumulating wraps of line terminating at a terminal end and adapted to have an object attached to said terminal end, said line storage means including a plurality of transversely spaced, stationary, first line guiding means mounted on said outer portion of said pole for receiving a plurality of wraps of said line, a plurality of movable, transversely spaced, second line guiding means freely movably mounted on said inner portion of said pole for movement from a first fully retracted position remote from said first line guiding means to a second fully extended position adjacent said first line guiding means and for receiving respective opposite wraps of said line from said first line guiding means with transversely spaced, non-overlapping partial loops of line each defined by a single wrap only around each set of corresponding transversely spaced first and second line guiding means, and actuating means for respectively letting out line by allowing reduction in the lengths of said wraps or retracting line by lengthening the wraps, said actuating means including means for moving the second line guiding means in a single movement toward and away from the first line guiding means between said fully extended and fully retracted positions, including wrap retaining means mounted on said inner portion of said pole, said movable second line guiding means being located between said fixed first line guiding means and said wrap retaining means and movable to a retracted position adjacent said wrap retaining means, said wrap retaining means automatically gripping said spaced wraps of line when said movable line guiding means are retracted, and means for releasing said wraps from said wrap retaining means independently of said movable line guiding means whereby said movable line guiding means can be extended to adjacent said first line guiding means and said wraps can thereafter be separately released to move outwardly as the line is extended.

2. The device of claim 1, said means for moving said movable second line guiding means including a fluidic piston, a track, a carriage mounted for reciprocable movement on said track, flexible means coupling said piston to said carriage wherein reciprocation of said piston moves said movable second line guiding means, and a fluidic pressure supply aperture for providing fluidic pressure in either of two directions to said cylinder for reciprocating said piston.

3. The device of claim 1, said actuating means including a manually movable handle.

4. The device of claim 1, said line being a light-weight fishing line, said first and second line guiding means being located externally of said pole for free movement of said fishing line during casting.

5. The device of claim 1, said first line guiding means each having a line receiving opening transverse to said pole, said second line guiding means including a plurality of rings with a ring encircling each of a corresponding first line guiding means with the plane of each ring passing outwardly beyond the line receiving opening of said first line guiding means and wherein the line extends along a straight path solely through said line receiving openings of said first line guiding means without passing through said rings when the line is extended.

6. The device of claim 1, said wrap retaining means each including a releasible hook for trapping the line, means for opening said hooks to release the line, said movable second line guiding means including a plurality of transversely spaced rings with wraps of the line being suspended separately between most closely adjacent curved surfaces of said rings thereby centering the wraps on said rings, said ring most closely spaced adjacent surfaces being aligned over said hooks thereby locating said wraps accurately into said hooks when the rings are retracted.

7. A line retrieving and casting device comprising:
an elongated mount having first and second ends;
a first set of transversely spaced line receiving guide means on said mount first end for receiving multiple wraps of freely movable line;
a second set of transversely spaced line receiving guide means on said mount second end and longitudinally spaced from said first set for receiving corresponding wraps so that the line is wrapped between said first and second sets of line receiving guide means;
said second set of said guide means being longitudinally movable toward and away from the first set of guide means for shortening or lengthening the wraps to feed out or retract the line;
releasible wrap retaining means on said second end of said mount remote from said first set of line receiving guide means;
means for moving said movable set of line guiding means adjacent to said wrap retaining means and for depositing said spaced wraps of line in said retaining means, said second line guiding means being movable toward said first line guiding means and leaving said wraps gripped in said retaining means; and
means for releasing said retaining means for releasing said wraps to allow the wraps to shorten, thus feeding out line independently of said movable second line guiding means.

* * * * *